United States Patent
Itskov

(10) Patent No.: US 10,146,930 B2
(45) Date of Patent: Dec. 4, 2018

(54) COMMUNICATION SYSTEM AND METHOD

(71) Applicant: JVL LABS INC., Markham (CA)

(72) Inventor: Boris Itskov, Markham (CA)

(73) Assignee: JVL Labs Inc., Markham, ON (CA)

(*) Notice: Subject to any disclaimer, the term of this patent is extended or adjusted under 35 U.S.C. 154(b) by 645 days.

(21) Appl. No.: 14/433,269

(22) PCT Filed: Oct. 4, 2013

(86) PCT No.: PCT/CA2013/000841
§ 371 (c)(1),
(2) Date: Apr. 2, 2015

(87) PCT Pub. No.: WO2014/053054
PCT Pub. Date: Apr. 10, 2014

(65) Prior Publication Data
US 2015/0242618 A1    Aug. 27, 2015

Related U.S. Application Data

(60) Provisional application No. 61/710,334, filed on Oct. 5, 2012.

(51) Int. Cl.
| | |
|---|---|
| G06F 13/00 | (2006.01) |
| G06F 21/44 | (2013.01) |
| G07F 17/32 | (2006.01) |
| H04B 5/00 | (2006.01) |
| H04W 12/08 | (2009.01) |

(Continued)

(52) U.S. Cl.
CPC ............ *G06F 21/445* (2013.01); *G06F 21/44* (2013.01); *G07F 17/3204* (2013.01); *G07F 17/3218* (2013.01); *G07F 17/3223* (2013.01); *G07F 17/3225* (2013.01); *G07F 17/3227* (2013.01); *G07F 17/3241* (2013.01); *H04B 5/0031* (2013.01); *H04L 63/08* (2013.01); *H04W 12/08* (2013.01); *H04L 63/062* (2013.01); *H04L 63/108* (2013.01); *H04L 63/18* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 2004/0209690 A1* | 10/2004 | Bruzzese | ................ | G07F 17/32 463/39 |
| 2007/0021198 A1* | 1/2007 | Muir | ....................... | G07F 17/32 463/29 |

(Continued)

*Primary Examiner* — Jason Yen

(57) ABSTRACT

A method and system for controlling a computer machine such as a casino game machine includes a remote activation arrangement that does not require the computer machine to complete an online communication or series of communications. The method and system utilize a QR type code associated with each computer machine to simplify the communication of necessary information to an online website supported by a computer server. A separate mobile device of an operator or user scans a QR type code of the machine and uses the QR type code to simplify the communication and registration with the server. An authorization code is transmitted back to the mobile device and manually entered in the machine allowing the machine to function in its intended manner.

17 Claims, 3 Drawing Sheets

JVL Machine Lease General Sequence Diagram

(51) Int. Cl.
*H04W 12/06* (2009.01)
*H04L 29/06* (2006.01)

(56) References Cited

U.S. PATENT DOCUMENTS

| | | | |
|---|---|---|---|
| 2007/0213117 A1* | 9/2007 | Okada | A63F 7/022 463/16 |
| 2007/0218989 A1* | 9/2007 | Okada | G07F 17/32 463/31 |
| 2008/0076570 A1* | 3/2008 | Johnson | G07F 17/32 463/42 |
| 2009/0197684 A1* | 8/2009 | Arezina | G07F 17/3216 463/42 |
| 2010/0234099 A1* | 9/2010 | Rasmussen | G07F 17/3218 463/29 |
| 2014/0018155 A1* | 1/2014 | Nelson | G07F 17/3225 463/25 |
| 2014/0094272 A1* | 4/2014 | Kelly | G07F 17/3225 463/25 |

* cited by examiner

Machines Lease

Date From: 01/01/2012 ▶  Date To: 05/01/2012 ▶  Machines: All  ...

| № | Created Date | Machine | Operator | Lease Expiration | Lease Status | Is Approved | Token Received | Token Created | Created By | Action |
|---|---|---|---|---|---|---|---|---|---|---|
|   | 01.01.2012 |   |   |   |   |   |   |   |   |   |
| ☐ 1 |   | machine 1 | operator 1 | 03.01.2012 | pending | ✓ |   |   |   |   |
| ☐ 2 |   | machine 2 | operator 1 | 03.01.2012 | pending | ✓ |   |   |   |   |
|   | 03.01.2012 |   |   |   |   |   |   |   |   |   |
| ☐ 3 |   | machine 3 | operator 2 | 03.01.2012 | pending |   |   |   |   | Edit |
| ☐ 4 |   | machine 4 | operator 3 | 03.01.2012 | pending |   |   |   |   | Edit |

[Create Lease] [Approve] [Sent Off-line]    [xls] [pdf]

COMMUNICATION SYSTEM AND METHOD

This application claims priority from U.S. Provisional Application Ser. No. 61/710,334 filed Oct. 5, 2012.

FIELD OF THE INVENTION

The present invention relates to a method and system for completing a communication between a computer device and an online authorizing computer. In particular, the method and system allows authorization of the computer device which is offline using an automated method that relies on communication with an online database server using a separate mobile device as an intermediary. In preferred embodiments the invention uses QR type codes as a coded signal generated and displayed on gaming machines or includes the coded signal in a near field communication signal.

BACKGROUND OF THE INVENTION

There are many applications particularly with respect to computing devices where authorization or registration of the device and/or the software thereof is required to allow the computing device to function in its intended manner. In most systems such machines are online or have the capability to directly communicate with a remote computer and the computerized machine exchanges a series of communications with the remote computer to successfully authorize the machine for its intended use. Such arrangements are also used with respect to licensing of software. Often, before software can be used a registration process must be successfully completed. This typically includes the machine recording certain information with the remote computer during an online communication.

In other applications and in particular casino gaming machines it is desirable to maintain control over an existing gaming machine which is offline and typically does not include an active online communication function. One such application is where game machines are leased to an offshore company and the games are used in a remote location, country or different jurisdiction. Various jurisdictions can have different requirements for allowing the machine to communicate with a remote database server and in some applications this type of dedicated machine may not have an active capability of communicating with the remote database server.

In situations where the gaming machines are not connected for online communication (offline) it is still desirable to maintain control thereof and typically the games may be licensed for a certain period of time and upon expiry of this time, the machine is rendered inactive, has reduced functionality and/or no longer executes the particular function, program or series of programs. Some lease arrangements include a percentage of profit or revenue of the machine and settlement is required from time to time. The system typically authorizes machines for a specified period of use and at the end of that period, a new lease arrangement or renewal is required.

A manual communication to create or renew a game machine lease or a manual procedure for extending a lease of an existing machine can include an individual operator entering certain parameters of the machine such as its unique serial number into a database using an online computer. The manual input of this information is not particularly efficient and tends to be time consuming and is subject to inaccurate information. These factors can contribute to non compliance or delayed compliance.

The present invention provides an efficient method for reducing manual steps and simplifies data entry provisions necessary to create or extend a lease or otherwise authorize a computing device to function or to continue to function in an authorized manner.

SUMMARY OF THE INVENTION

A method of completing a communication between a computer and a remote server having an online transmission address according to the present invention comprises using the computer to generate a coded signal that includes the transmission address of the remote server and at least identification information of the computer;

using the computer to communicate the coded signal for receipt by a separate mobile device;

positioning the separate mobile communication device in close physical proximity to said computer and using receiving capabilities of the mobile device to receive the coded signal and to decipher the coded signal and obtain the transmission address and the at least computer identification information;

using the mobile communicating device to transmit to and communicate with the remote server using the transmission address of the at least computer identification information;

receiving the transmission at the remote server and obtaining the at least computer identification information;

based on the received transmission transmitting an authorization signal for the computer to the mobile device;

using the mobile device to receive the authorization signal;

providing the authorization code to the computer; and using the authorization code to determine the operation of the computer for a further period time and/or to alter the functionality of the computer.

Preferably the coded signal is transmitted in a QR coded displayed by the computer and scanned by the separate mobile device. In an alternate embodiment the coded signal is transmitted in a near field communication signal and received by the mobile device. In both embodiments the mobile device is in close or what may be considered near proximity to the computer.

The present invention is also directed to a computer, preferably a game machine, that can utilize this method as well as the system of components necessary to utilize this method.

In an aspect of the method, the at least computer identification information includes computer operation information. Preferably, the at least computer information is encrypted by the computer and this encrypted information is provided in the coded signal displayed by the computer or transmitted by the computer.

In a further aspect of the invention, the said authorization code is transmitted to the mobile device and manually entered in the computer.

In a preferred aspect of the invention, the computer upon receipt of an authorization code confirms the authenticity thereof and if authenticate modifies the computer to perform or to continue to perform a particular operation or function stored therein.

This particular method is advantageously used for gaming machines and the at least identification information of the computer preferably includes gaming performance information. In a preferred embodiment the gaming machine includes a restricted function level which is automatically activated if a new authorization code is not provided at a predetermined time or operation condition. The game machine, upon receiving a new authorization code, continues or resumes a normal operational mode.

A method of authorizing a machine having a computer, a memory storage arrangement and programming for allowing said machine to function for a specific use according to the present invention, comprises activating the machine and entering a setup mode;

obtaining a QR code associated with the machine and including a transmission address and at least an identification code;

displaying said QR code;

scanning the displayed QR code using a mobile computer device and extracting therefrom the transmission address and identification code;

using the mobile computer device to transmit at least the identification code to the transmission address;

receiving at least identification code at a remote computer server;

using the at least identification code to access a database of the remote server and obtain an authorization code;

transmitting the authorization code to an authorized user;

entering the authorization code into the computer of the machine; and using an authorization algorithm stored in the computer to confirm the authorization code and if confirmed activating the programming and the machine for the specific use preferably step of obtaining the QR code and transmitting the QR code is performed by a cellular telephone device.

In one embodiment, the step of transmitting the authorization code includes transmitting the authorization code to a predetermined electronic address.

In a further embodiment the remote computer server upon receiving the at least identification code deciphers the at least identification code and transmits the deciphered information to a security library to identify machine information specific to the machine and provides the specific machine information to the remote computer server.

The present invention is also directed to a system that operates in this manner and a gaming machine capable of functioning in such a system.

BRIEF DESCRIPTION OF THE DRAWINGS

Preferred embodiments of the invention are shown in the drawings, wherein:

FIG. 2 is a spreadsheet of the casino server website that tracks various licenses associated with different machines.

DETAILED DESCRIPTION OF THE PREFERRED EMBODIMENTS

Figure 1:
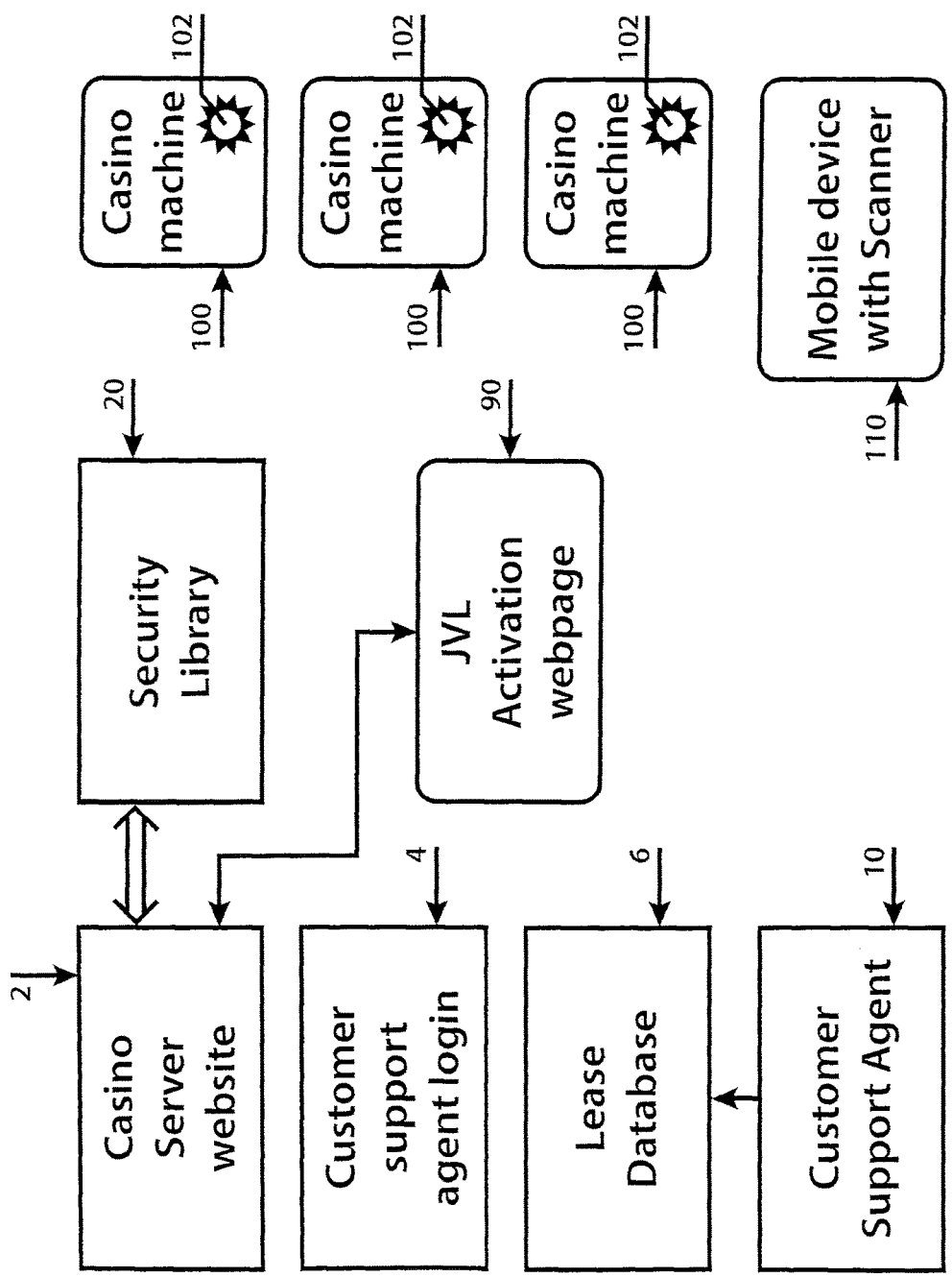
FIG. 1 is a schematic view of a casino server website and the interaction thereof with a casino machine to be activated.

The preferred embodiment is described with respect to gaming machines however it has application with respect to other computing devices. FIG. 1 shows a general layout of a series of casino machines 100 that are offline machines and are not designed or required to communicate online with the remote casino server website shown as 2. Basically each of the casino machines 100 have one or more games of chance and the machines and/or one or more of the games require authorization before the machine or game will operate in a particular mode or capability. Each of these game machines can generate and display a QR code 102 that is particular to the game machine (preferably attached thereto or displayed in an initial available security or setup screen). This QR code can be automatically scanned by a mobile device (such as a smart phone) that is capable of communicating with the casino server website. The game machines also include an input arrangement (such as a touch screen also used to play the games) that an operator will use to configure, update or obtain performance information.

Most mobile phones now include software for scanning and deciphering QR codes to access an identified website. Such a website is shown as 90 in FIG. 1 and this website allows access to the casino server website 2. The information transmitted to the website that was determined based on the QR code preferably includes a series of parameters such as a security token, a machine serial number, an IC board serial number and a current IC board time. This information is typically encrypted in the QR code. Transmission of this information to the casino server website 2 allows the casino server website to process the encoded parameters. This processing as shown in the figures can include forwarding the information to the security library shown as 20 and the security library extracts the parameters for the particular gaming machine. With this arrangement the transmission of actual information based on a QR code allows convenient access to the casino server website and simplified transmission of identification parameters of a particular casino machine. The database is updated with the additional information.

The casino server website includes a customer support agent login portion identified as 4 and it also includes a lease database shown as 6. The lease database includes the machine ID, new lease date, date of entry, user ID and a particular status. Machine Information may be stored in a series of data sheets 200 as generally shown in FIG. 2. Activation of a lease can also automatically associate with these parameters a lease expiry date. Once the particular parameters of a QR code have been determined it is possible to then access the lease database 6 and determines an existing lease contract or the parameters for a new lease arrangement. The system also includes a customer support agent portion 10 that allows a support agent to enter initial information with respect to a lease at the time of the sale of a casino machine or at other times before the initial authorization.

Often leasing of gaming machines is for a short period of time to establish the performance of the game machine and popularity of the games. An outright purchase of the gaming machine is likely to occur if performance is acceptable. With the lease arrangement an operator wishing to activate a particular casino machine would turn the machine and enter a setup mode or otherwise obtain the QR code. Under the setup mode there would be a security tab and the security tab may well display on the screen the QR code. This QR code may be scanned using an android type bar screener or other suitable technology now common with mobile phones. The scanning of the QR code provides a simply and accurate arrangement for communicating the information of the particular casino machine to the casino server website after processing by the mobile device. The parameters of the individual casino machine are encoded in the QR code initially extracted by the mobile device and the website of the casino server 2 is provided with this information and used to initiate the communication. Upon receipt of such information, the casino server website 2 contacts the security library 20 and provides the information or data thereof to the library. The library effectively extracts the required information therefrom and provides it to the casino server website. With this information the casino server website 2 can access the lease database arrangement 6.

The details of the lease form can be taken from the table as this information has been previously entered at an earlier date as discussed above. The server will determine if any new lease update information is required or if any new lease is pending for this machine. The server can then calculate a new lease term typically measured in days or months and the server will generate a new token. The server communicates with the security library that prepares a new encrypted series of parameters and provides this encrypted information to the server. The server updates the information in the database and updates a lease request response table associated with the database. The server then transmits an encrypted message back to the mobile web browser of the operator that was used to initiate communication with the server. The database is effectively updated and the lease form displays status online sent at that point. The operator upon receiving the information provided by the server, uses an activation code provided therewith and enters the activation code in the particular manner required by the machine. Typically the machine includes an activation code section that is part of the security arrangement. The machine upon receiving the activation code will use a security algorithm associated with the machine to confirm the authenticity thereof and if so confirmed will then activate the machine for use of the various programming thereof.

Figure 3:
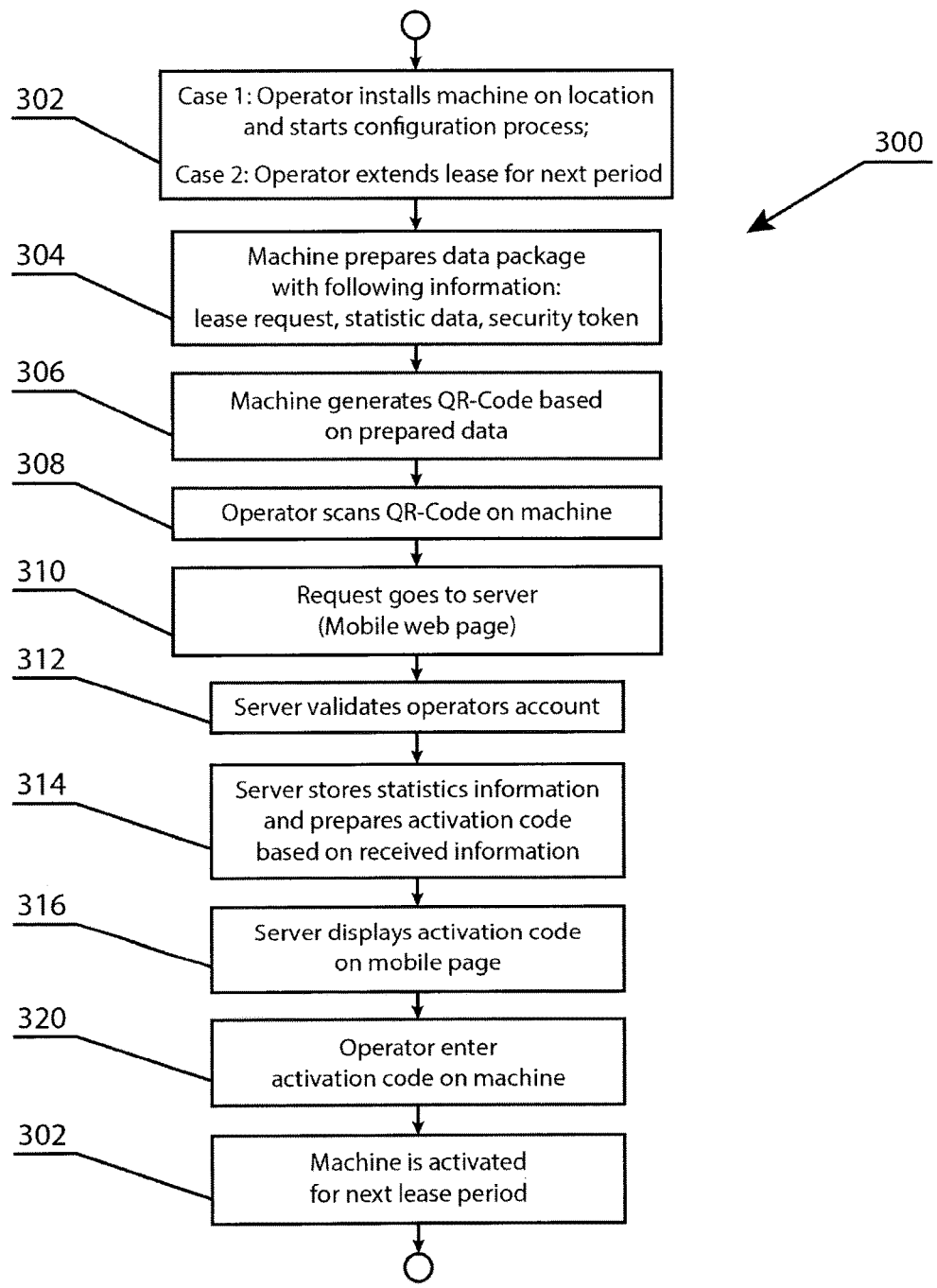
FIG. 3 is a flow chart of the general leasing sequence disclosed in the application.

FIG. 3 illustrates a method procedure 300 for initially activating a game machine or extending a lease of a game machine. At step 302 the operator enters instruction to the game machine to activate the game machine or to extend the lease thereof. Step 304 is the inputting and gathering of information for transmission to a remote server. The QR type code (with the gathered information encoded) is generated by the gaming machine at step 306 and displayed at the game machine. The operator at step 308 scans the QR code producing the step 310 of communicating with the remote server. At 312 the server validates the information and stores the appropriate information at 314 thus updating a database. The server at step 316 displays the activation code on the mobile page. The operator enters the displayed activation code into the game machine at step 318. The machine confirms the code and activates or updates the machine at step 320. With this procedure the game machine remains offline.

With the above arrangement the actual casino game machines are offline yet they are only authorized to operate in their normal function for a particular period of time. Upon expiry of this time or as the expiry time is approaching the machine can provide reminders to the operator that a new lease arrangement is required. The operator is then required to renew the lease or enter a new lease arrangement with the casino server website. Other arrangements of notice, for example, reminders from the server to a mobile device or designated contact can also be used.

Initial activation of a gaming machine could include scanning of a QR code provided with the game machine prior to shipment thereof. In this situation the game machine is activated by loading the authorization code when eventually received. As can be appreciated there are no performance statistics prior to initial activation. This is in contrast to renewal applications.

The particular system and method as described simplifies the authorization procedure and in particular provides effective communication of the machine information to the casino web server database without the machine being online. The various types of leases associated with a particular game machine can be prerecorded with the casino web server and implemented when appropriately confirmed by the authorized operator. The authorized operator preferably uses a mobile device with a scanning capability for scanning information provided by the machine and communicating this information to the website. Upon receipt of this coded information the website extracts the particular information and eventually identifies the particular machine and provides the appropriate confirmation to the mobile device of the operator to activate a machine. In a preferred embodiment a payment can be provided using the mobile device.

The present system allows secure information to be sent to a secure database (library) for extraction. This may not be required for all applications but provides additional security and confidence.

With the arrangement effective control of the gaming machines is maintained. This is particularly advantageous where game machines are leased for a predetermined period of time or as part of a revenue sharing arrangement. As described this system is easily adapted to accommodate situations where one or more gaming machines are operated on a profit share type basis with a further party. In some countries and in some applications it is more desirable that the games be effectively leased to such operators yet the owner of such leased machines still wants to maintain effective control over the machines. The activation of a lease and the maintenance of a lease provides a simplified system for maintaining the necessary authorization while still providing a convenient control system that is easily activated and/or renewed. In the event of difficulties the machines may be restricted or shut down.

The use of the QR type code with respect to lease renewal for offline machines provides an effective approach for maintaining control of the machines even though the actual physical location of the machine may not be known or readily available. The gaming machines are operable for a specific time period and at the expiry of that time period a new authorization code must be entered. The authorization code is preferably provided by an automated server associated with the lessor. The gaming machine includes software for generating and displaying the QR code on the viewing screen. This QR code preferably includes information providing detailed statistics regarding the performance of the machine. For example, the QR code can include therein data associated with counters for tracking money in and money out, such as over a certain time period (i.e. 6 months, etc.) Depending upon the statistics that the lessor wants, this type of data can be provided for certain periods within the overall timeframe (for example 24 weeks of the six month time period).

The QR codes are capable of encoding a fixed amount of data and the QR code initially includes information identifying the particular machine or particular leasee for proper tracking of that gaming machine.

Typically operators do not provide or are reluctant to provide performance information with respect to machines even if there is an existing lease or contract to do so. These machines may be located in foreign countries or in physical facilities that are not readily available to the lessor. In one embodiment of the present invention the game machine will provide a warning with respect to the upcoming expiry of a certain lease period that will require the entry of a new code. This will alert the operator that a reporting function is required. He can use the gaming machine to produce the necessary QR code which has been previously computer coded by the leasor or owner to provide specific game information. Even though the gaming machine is offline, the operator scans the produced QR code using a mobile phone or other suitable device to communicate the information directly to the online game server that has been identified in the QR code. In this way the leasor can obtain specific information and when this specific information is received and to appropriately extend the lease by transmitting a further authorization code to the operator by email or by direct connection with his mobile device for manual or automated entry in the game machine.

The above system has been described with respect to the transmission of a single QR code from the gaming machine to the server. It can further be appreciated that this could include a multiple step process where the game machine produces a first QR code with certain information followed by an authorization code from the server which would prompt the game machine to produce yet a further QR code providing additional gaming information. In this way the operator need not be limited to information that can be effectively coded in a single QR code. The QR code is a desirable system for transmitting coded game machine information to the server. Other arrangements for supplementing the initial QR code game information can also be used.

As can be appreciated, leases, rental of game machines or contracts with respect to gaming machines can be performance based or merely require certain payments at certain times. The provision of the QR code and the ability to effectively stop or limit the performance of a game machine provides substantial leverage for the leasor or current owner that the contract will be honoured.

The system has also been described with respect to both initial activation of one or more game machines and subsequent renewal of the lease, rental or other contract. Control of the initial installation or activation of a gaming machine or other computing device is particularly desirable.

One particularly advantageous use of QAR type codes is to allow changes in the configuration of one or more game machines. AS operator can select additional games or options (such as allowing progressives, activating a demo mode function, or providing additional game statistic, reporting or other game machine functionality) where the machine generated QR type code transmits the request to the remote server. The code returned to the mobile device may allow activation or alteration of one or more game machines as indicated in the request. Various arrangements for payment can be used including those previously described.

The ability of the gaming machine to produce a QR code that provides gaming performance statistics is advantageous with respect to the enforcement of contracts where certain terms of the contract may not be fulfilled or require encouragement to be fulfilled. In other applications, an operator may have already provided all of the information to the leasor and is merely waiting for an authorization code. For example, if the operator has already received payments with respect to a gaming machine where the authorization period is up for renewal, the appropriate authorization code can be provided to the operator before the expiry and without the necessity of producing the QR code. Such authorization codes can be provided in an email communication or other appropriate communication allowing the leasee is able to update the machine before any possibility of the game entering a more restricted mode. In the case of a transfer of ownership in the gaming machine a further authorization code can be provided.

The QR code can also be used to communicate information from the operator to the server of a desire to change the terms of the lease or operating status of the machine. For example, there may be additional games that the operator wishes to activate and realizes there is a certain payment or change in the contract that is required. The gaming machine can include a library of a series of games where only some of the games are activated in certain modes and thus an operator can express a desire to change that mode. This information can be part of the information transmitted in the QR code. This type of application need not initially involve a lease as it is also effective for update procedures for previously purchased game machines.

In this aspect the operator would enter a setup mode with respect to the machine where a list of possible options is available to him. He can then select the options that he wants provided by the game machine. The game machine can then communicate this information to the server by embedding the information in a QR code. The operator can transmit the QR code to the server which will recognize that a desire to change the status of the gaming machine has been received as well as the particular identity of the gaming machine and operator. The server can then communicate a message to the mobile device regarding the change in status of the machine and optionally the required additional payment. If this is a onetime payment or a payment for a certain period of time, the server can also provide details to the mobile device such as the user's mobile telephone to affect direct payment at that time. As is well known, an electronic payment procedure can be made to the server and upon completion of the financial transaction the appropriate authorization code is provided to the user for entering in the gaming machine.

With this arrangement, the gaming machine already includes the additional games and the additional capabilities but requires a particular authorization code to activate these particular features. In this way the leasor or manufacturer of the machine maintains control of the machine even though the machine is offline and the actual physical location of the machine may not be known. The system is both convenient for the owner as well as the operator.

QR codes can also be used with respect to the actual operation of the machine and certain payments made from the machine and/or collections of funds from the machine. For example, the operator of the gaming machine may wish to provide additional control regarding hand payments made in a gaming facility. There are certain circumstances, for example if the amount of funds is not available to the gaming machine or even if the funds are available, the payout amount exceeds a particular limit, where a hand payment is required. Such hand payments are known where the player is advised that a hand payment will be made and an attendee will meet the player at the gaming machine and complete the payout. For hand payments, the game machine can produce a QR code on the screen that is required to be scanned by the attendant. This particular scan can communicate either with a game machine server of the operator. In any event, the information provided in the QR code is provided to a computer system. Typically the computer system will provide a confirmation back to the mobile device that this particular payment has been logged with the computer and a further code can be entered into the gaming machine. The attendant can then pay the required amount and the game machine returned to normal operation. It is also possible that the game machine is online with a direct connection to the server that the particular communications between the gaming machine and the server are automated where the signal provided by the attendant who is scanning the QR code on the game machine is effectively acknowledge by the server and the server sends a signal back to the gaming machine to return it to normal operation. In this case the attendant then pays the particular player. This arrangement provides an electronic record of the payment process and the attendant involved.

Other attendant features using a QR code generation and tracking function can include changes in game machine setup such as resetting of certain parameters on the gaming machine (such as tilt counter) and other activities such as day end or collection activities where certain funds or accounting type information for a particular period of time is collected and funds transferred. QR code generation by the gaming machine can provide communication of this information to a server and other steps can be provided for effective authorization of the gaming machine.

A further aspect of QR codes can include troubleshooting of a gaming machine where the gaming machine produces a QR code on the screen together with operating parameters (for example tilt number) and the information via the QR code is separately communicated to a website. This communication can provide detailed information about actual performance of the machine as well as other player conditions that may be detrimental to the machine. For example, if a gaming machine detects a possible fraudulent activity it could default to a report function where a QR code is generated and displayed in the screen. The attendant could then attend at the machine, scan the code and obtain the information that the gaming machine has experienced a possible fraudulent condition. This provides immediate response and feedback to the operators.

It is also anticipated that the QR code can be used to provide an initial or compliance requirement for governments or government regulations regarding the actual use of the machines. The generation of QR codes by the gaming machine can provide initial information that is stored by the machine and tracked by the particular government body. Full detailed information of the gaming machine can be provided when requested.

Another example of use of the QR code is with respect to product registration. Upon initial setup and commencement of use of the machine, a QR code registration can be provided where at least the particular date of activation is known. Other information can also be required by the operator to complete certain steps prior to generation of the QR code. Again, an appropriate authorization code is provided by the remote server.

Authorization and registration of particular gaming machines, given that an operator is already known to the remote server, are also simplified using the QR codes. The operator can enter a game setup screen and provide certain code information regarding his identity and location of the particular machine. This information can then be provided to the remote server in a QR code. In the case of a new operator, the new operator could have previously provided all of his contact particulars to the server using an online method not related to the actual game machine. He can then be provided with his own operator code, location code, etc. for that particular game machine. Entry of this information in the gaming machine will allow the gaming machine to effectively communicate the information to the server and allow activation.

The game machine itself can include software for allowing an operator to enter location information and operator information to be sent to the server using the QR code feature. For example, the operator can enter personal information on the machine such as a personal PIN code and also enter location information on the machine setup screen. The machine produces the QR code on the screen which is scanned by the operator using a separate device. The QR code is communicated to the server and the server determines position information of the game machine using a GPS function of the mobile device or general location by IP address, for example. This information is then stored by the server. This procedure is advantageous with respect to game machine initiation setup, as one example.

The above example assumes that the mobile device of the operator includes a GPS type function. It is also possible for the game machine to be equipped with a GPS receiver that receives GPS coordinates. This information can be provided in the QR code in combination with other information as part of a game initiation step or at other times.

The capability to generate a QR code or a near field communication (as subsequently described) and to effectively use a QR code is not limited to the operator and the owner. For example, a game machine that is capable of producing a QR code can use this function to communicate with a player. For example, a player reward function is provided where the game machine produces a QR code that the player can scan using his mobile device to communicate with a remote website. The remote website receives additional information and provides a bonus to the user. For example, the bonus could include a particular authorization code which, when entered in the game machine, provides further enhancements or access to a further game. The QR code can also be built into games and need not be part of a bonusing function. For example, as part of a game the QR code could be displayed on one or more of the reels in a slot type game. The player could scan the code that is displayed on the reel to access a further feature of the game, for example a money bonus. If the game machine is offline a code can be provided to the player which, when entered into the machine, affects the money bonus or game bonus. Therefore it can be appreciated that the QR code can be used to provide some additional player tracking functions or player bonusing functions.

The following is related to the specifics regarding a player tracking system and cashless payment similar to the ticket in/ticket out (TITO) principle.

Technology Similar to TITO:
On-Line mode:
    For transferring money to machine:
      1) Player scans QR code on screen of machine;
      2) Application directs player to web page where he can enter his PIN number;
      3) Server transfers money from player's account to machine.
    For transferring money from machine:
      1) Player scans QR code on screen of machine after pressing cash out button;
      2) Application directs player to web page where he can enter his pin number;
      3) Server transfers money from machine to player's account on server.
Off-Line Mode:
    For transferring money to machine:
      1) Player scans QR code on screen of machine;
      2) Application directs player to web page where he can enter his PIN number;
      3) Server provides activations code;
      4) Player enters activations code to machine;
      5) Machine accepts money based on activations code;
      6) Server decreases user balance for transferred amount.

For transferring money from machine:
1) Player scans QR code on screen of machine after pressing cash out button;
2) Application directs player to web page where he can enter his PIN number;
3) Server accepts money to player's account based on QR code information;
4) Machine removes money from machine balance.

Another option for transferring money to machine is scan QR code by machine (in similar way as airlines doing check-in process).

Requirement: Machine equipped with QR code scanning device or camera.
1) Player's device generates QR code with personal information;
2) Machine scans generated QR code and transfers money from or to player's account.

The server can also track the player, give different kind of personal bonuses, and personalize games preferences based on the player's identification information provided in the QR code.

Machine Equipped with a Camera:
The operator may need to configure multiple machines on location with the same settings.
Requirement:
Machine equipped with QR scanning device or camera.
Steps:
1) Operator configures one machine;
2) Configured machine generates QR code and displays it on set-up screen;
3) Operator transfers QR code to mobile device (for example taking a picture of the QR code);
4) Other machines scan the QR code from the mobile device, decode it and configure themselves in the described way.

Machine Equipped with Near Field Communication (NFC) Device:
The NFC device can be used in similar way as QR code for almost all described features. Interaction with the machine will require touching the machine by a mobile device which is running special applications in case of NFC availability. The machine will be able to receive lease, configuration, and registration information via NFC as well as transfer statistics, configuration and registration information to a mobile device and to a server.

Cashless system can be organized in a few ways using NFC:
1) NFC only:
  1) Machine generates NFC signal;
  2) Mobile device scans NFC signal and interacts with server in order to transfer money from user balance to machine;
  3) In case of cash-out event machine also generates special NFC signal and mobile device interacts with server in order to transfer from machine to user balance.
2) Combination of NFC and QR Code:
  1) For cash-in:
    1) Machine generates QR code;
    2) Player scans QR code using mobile device;
    3) Mobile device interacts with server in order to get user amount;
    4) Mobile device transfers user amount to machine using NFC signal.
  2) For Cash-Out:
    1) Player press cash-out button;
    2) Machine generates QR code;
    3) Player scans QR code using mobile device;
    4) Mobile device interacts with server in order to transfer amount to user balance;
    5) Mobile device receives confirmation from server;
    6) Machine removes money from user balance.

Near field communication (NFC) provides a different methodology for transmitting game machine information to a mobile or other device for transmission to a remote server. NFC signals can be used in the same manner as the QR type code for allowing game functionality to be controlled and/or game reporting to the server. As can be appreciated a user's device equipped with NFC capability can communicate with a game machine and the information then communicated by the user's device to the remote server. The remote server then sends information back for the one or more game machines affecting the desired additional functionality and/or continued operation. NFC is an alternative approach and can be used to provide the same results as described with respect to QR codes.

With this system an operator can select additional games or options on the game machine or on a website allowing the operator to configure one or multiple machines at the same time and provide payment on the website. The lease, rental agreement or contract will be generated automatically based on terms and machines can be scanned to activate the new functionality.

Although preferred embodiments of the present invention have been described herein in detail, it would be understood by those skilled in the art that variations may be made hereto without departing from the claimed invention.

The embodiments of the invention in which an exclusive property or privilege is claimed are defined as follows:

1. A method of completing a communication between a computer and a remote server having an online transmission address comprising
  using said computer to generate a coded signal that includes the online transmission address of the remote server and at least identification information of the computer;
  using the computer to communicate the coded signal for receipt by a separate mobile communication device;
  positioning said separate mobile communication device in near proximity to said computer and using receiving capabilities of said separate mobile communication device to receive the coded signal and to decipher the coded signal and obtain the online transmission address and the at least computer identification information;
  using the separate mobile communicating device to transmit to and communicate with the remote server using the online transmission address of the at least computer identification information;
  receiving the online transmission at the remote server and obtaining the at least computer identification information;
  based on the received online transmission transmitting an authorization signal for said computer to said separate mobile communication device;
  using said separate mobile communication device to receive said authorization signal;
  providing said authorization code to said computer; and
  using said authorization code to determine the operation of the computer for a further period time and/or to alter the functionality of the computer.

2. The method as claimed in claim 1 wherein the coded signal is a QR code displayed on a monitor of said computer and the step of communicating said QR code to said separate mobile communication device includes using said separate mobile communication device to scan and decipher said QR code.

3. The method as claimed in claim 1 wherein said step of communicating said coded signal includes providing said coded signal in a near field communication transmission signal transmitted by said computer and said separate mobile communication device receives the near field transmission signal and determines the coded signal.

4. The method as claimed in claim 1 wherein the at least computer identification information includes computer operation information.

5. The method as claimed in claim 4 wherein said at least computer information is encrypted by the computer and this encrypted information is provided in the coded signal.

6. The method as claimed in claim 5 wherein said authorization code is transmitted to and displayed on the separate mobile communication device and a user manually enters the authorization code in the computer.

7. The method as claimed in claim 6 wherein the computer upon receipt of the authorization code confirms the authenticity thereof and if authenticate modifies the computer to perform or to continue to perform a particular operation or function.

8. The method as claimed in claim 7 wherein the computer is a gaming machine and the at least identification information of the computer additionally includes gaming information.

9. The method as claimed in claim 8 wherein the gaming machine includes a restricted function level which is activated if a new authorization code is not provided at a predetermined time or operation condition, the game machine upon receiving a new authorization code continuing or resuming a normal operational mode.

10. A method of authorizing a machine having a computer, a memory storage arrangement and programming for allowing said machine to function for a specific use comprising:
   activating the machine and entering a setup mode;
   obtaining a coded signal associated with the machine with the coded signal including an online transmission address and at least an identification code of the gaming machine;
   communicating said coded signal to a separate mobile device in near proximity to said machine;
   said separate mobile device receiving said coded signal and extracting therefrom the online transmission address and said identification code;
   using the separate mobile device to transmit at least the identification code to the online transmission address;
   receiving the at least identification code at a remote computer server;
   using the at least identification code to access a database of the remote server and obtain an authorization code;
   transmitting the authorization code to an authorized user;
   entering the authorization code into the computer of the machine; and
   using an authorization algorithm stored in the computer to confirm the authorization code and if confirmed activating the programming and the machine for the specific use.

11. The method as claimed in claim 10 wherein said step of transmitting said coded signal includes using said machine to display a QR coded signal and said separate mobile device scans said QR coded signal.

12. The method as claimed in claim 11 wherein said step of transmitting the authorization code includes transmitting the authorization code to a predetermined electronic address.

13. The method as claimed in claim 10 wherein the remote computer server upon receiving the at least identification code deciphers the at least identification code and transmits the deciphered information to a security library to identify machine information specific to the machine and provides the specific machine information to the remote computer server.

14. A game machine comprising a computer including gaming software for playing games and operational software for controlling the operation and functional capabilities of the game machine, and a display monitor, and wherein
   said game machine further includes an operator accessible control software for generating a coded signal to be communicated to a separate mobile device in near proximity thereto as a QR code display on said display monitor or as a coded signal transmitted as a near field communication;
   said game machine including an arrangement for receiving as authorization signal from the separate mobile device that when received is used by said operator accessible control software to maintain or alter said operational software; and
   wherein said operator accessible control software is capable of generating an QR code for display on said monitor incorporating specific game machine information in response to a game report mode where an operator enters game request instructions and the game request instructions and a server address are included in the QR code; said QR code when displayed on said monitor being scannable by the separate mobile device for communication using said server address.

15. A game machine comprising a computer including gaming software for playing games and operational software for controlling the operational and functional capabilities of the game machine, and a display monitor, and wherein
   said game machine further includes an operator accessible control software for generating a coded signal to be communicated to a separate mobile device in a near proximity thereto as a QR code displayed on said display monitor or as a coded signal transmitted as a near field communication;
   said game machine including as arrangement for receiving an authorization signal from the separate mobile device that when received is used by said operator accessible control software to maintain or alter said operational software; and
   wherein said game machine includes a near field transmitter/receiver and said authorization signal is included in a near field communication signal received by the separate mobile device.

16. A game machine as claimed in claim 15 wherein said authorization signal is with respect to maintaining or extending an operation functionality of the game machine.

17. The game machine as claimed in claim 16 in combination with a remote server having information with respect to said game machine and codes for activating, maintaining or increasing the functionality of the game machine and wherein said remote server communicates with said game machine using the separate mobile communication device as an intermediary.

* * * * *